UNITED STATES PATENT OFFICE.

CHESTER B. DURYEA, OF NEW YORK, N. Y.

PROCESS OF TREATING STARCH.

SPECIFICATION forming part of Letters Patent No. 643,323, dated February 13, 1900.

Application filed August 16, 1899. Serial No. 727,428. (No specimens.)

*To all whom it may concern:*

Be it known that I, CHESTER B. DURYEA, a citizen of the United States, and a resident of New York, borough of Manhattan, State of New York, have invented a new and useful Improvement in Methods of Manufacturing Starch, of which the following is a specification.

My invention relates to an improvement in the method of manufacturing starch, by which a starch product composed of smaller granules and a product composed of larger granules is obtained from the material under treatment.

Starch as a gross mass is made up of very small individual particles called "granules." The average size of starch granules from different grains, &c.—as, for example, corn, rice, and potatoes—vary greatly, and, further, the granules from any one source also differ very much in size. For instance, corn-starch granules vary from about two ten-thousandths of an inch to twelve ten-thousandths of an inch in diameter, while that of rice varies from about one ten-thousandth to three ten-thousandths of an inch.

In the ordinary processes of starch manufacture in separating the starch from the various impurities which are associated with it after the usual operations of milling and sieving or their equivalents it is finally deposited in a wet condition upon the well-known "runs" or their equivalents, which may be the bottoms of cisterns or the baskets of centrifugal machines. The starch at this stage of its manufacture, if the previous treatment has been properly conducted, requires merely to be washed to render it sufficiently pure for drying and finishing. This washing is commonly carried out by putting the starch in suspension in water, agitating it, and then allowing it to deposit completely in cisterns, when the supernatant water may be drawn or pumped off. This operation has many disadvantages. It is very lengthy, subjects the starch, especially in very warm weather, to danger of fermentation, and requires a great deal of attention to shorten the operation as much as possible without at the same time causing a loss of starch. The larger starch granules settle very much faster than the smaller ones, and in practice it is necessary to allow nearly forty-eight hours for the complete settling of all of the granules, although the larger ones, which make up most of the starch, come down in about twenty-four hours. It is thus seen that nearly twenty-four hours extra must be allowed for the settling of the fine granules, which make up but a small proportion of all the starch from the crude materials.

The above statement depends, of course, to some extent upon the height of cisterns, the kind of starch under treatment, the initial specific gravity of the starch liquor, &c., but is correct for settling-cisterns such as are commonly used and in the usual manufacture of starch from corn.

It has been the general opinion of starch manufacturers that the small granules are greatly inferior to the large ones for laundry purposes. A great expenditure of time and attention has, however, been given to collecting the smaller as well as the larger all together, so as to make the yield from the materials as great as possible.

I have discovered that the small granules are of very great laundry value, especially when separated from the large and used by themselves. In certain special kinds of work they have proved greatly superior to the large, and my present invention consists in the separation of these smaller granules from the larger ones, thereby accomplishing a double purpose—viz., the production of two bodies of starch, one of larger granules and another of smaller granules, each well adapted to its special work, and the material saving in time and labor for the production of starch composed of the larger granules.

In carrying my process into practical effect I suspend the mixed granules in a suitable fluid, water being at the present time preferred, and subsequently separate the smaller from the larger granules by fractional deposition. The starch to be operated upon, wet or dry, may be taken from any step in the ordinary process. I prefer, however, in order to avail of all the benefits which my invention affords, to make the separation during the usual operation of washing. When applied as above in washing-cisterns about six feet deep and when the starch in washing is diluted to about 8° Baumé, the procedure is very simple. It is only necessary to allow the starch to settle for about twenty-four hours, depending upon the amount and average size of the smaller granules desired. Then after running off the clear water all the starch still in suspension is at once pumped or drawn off down to the deposited starch at the bottom of the cistern; but instead of this intermittent method a continuous one may be employed for carrying out my process—such as, for instance, the use of a hopper-bottomed tank provided with an inlet near the center for a continuous inflow of water containing the mixed granules, an overflow or outlet near or at the top for the outflow of water and small granules, and one at the bottom for the remainder of the water and the large granules. This starchy water so pumped or drawn off containing the smaller granules may be collected in cisterns for complete deposition by settling and then taken up and dried in the usual manner, or it may be run through a centrifugal machine for the separation of the starch from the water and then dried or, in fact, collected and dried in any convenient manner. This removal of the starchy water containing the smaller granules will leave the body of starch composed of the larger granules, which has already settled, ready for being dried in the usual manner, thus saving, as far as the washing is concerned, about one-half the time usually required for producing the body of starch of larger granules and at the same time securing the body of starch of smaller granules as an independent mass and without an expenditure of time materially greater than has been commonly required for producing the mass of mixed granules.

What I claim is—

The process of manufacturing starch consisting in separating the starch mass into independent bodies, one of the bodies being composed of granules of one dimension and another of the bodies being composed of granules of a different dimension, substantially as set forth.

In testimony that I claim the foregoing as my invention I have signed my name, in presence of two witnesses, this 25th day of July, 1899.

CHESTER B. DURYEA.

Witnesses:
A. B. BEACH,
HY. CHEPMELL.